Aug. 5, 1930.  T. SCHOU  1,772,114
POLE MOUNTING FOR ELECTRO DYNAMO MACHINES
Filed June 3, 1927
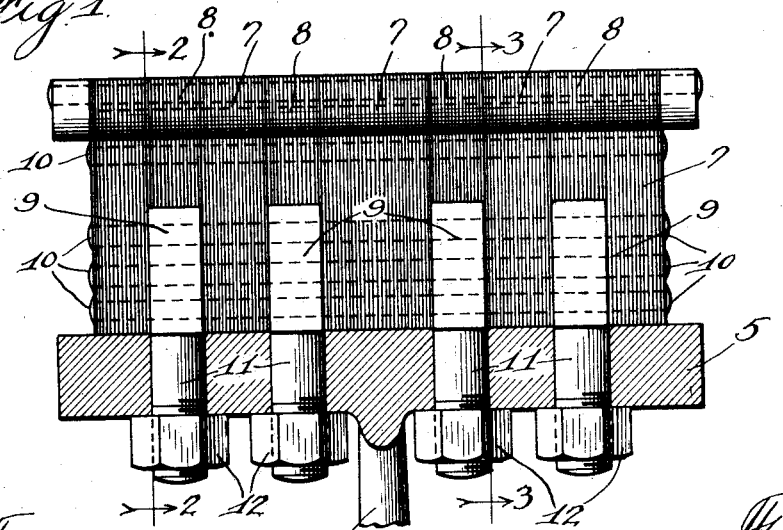
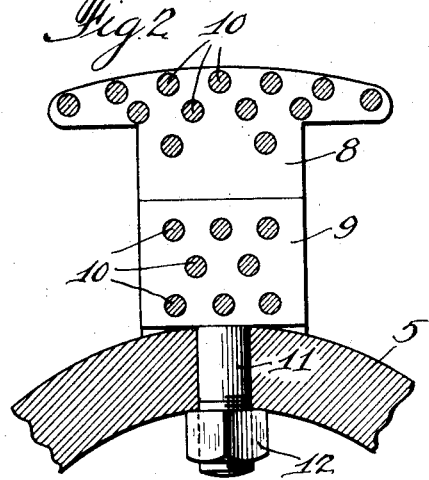
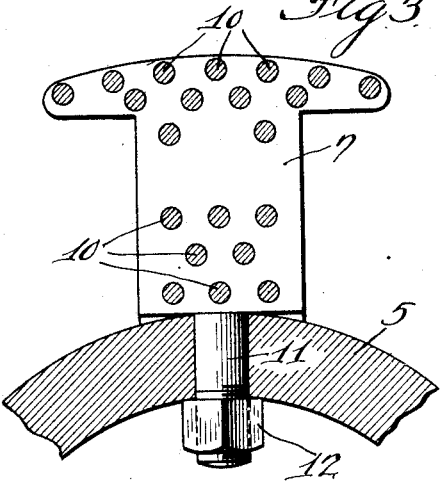
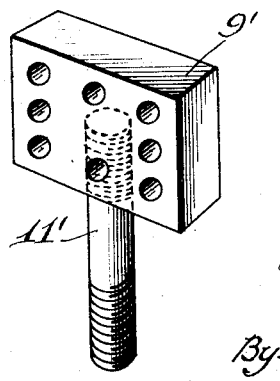
Inventor
Theodor Schou,
By Nissen & Crane
Attys
Witness
Dave S. Magnusson Patented Aug. 5, 1930

1,772,114

UNITED STATES PATENT OFFICE

THEODOR SCHOU, OF MANSFIELD, OHIO, ASSIGNOR TO THE IDEAL ELECTRIC & MANUFACTURING CO., OF MANSFIELD, OHIO, A CORPORATION OF OHIO

POLE MOUNTING FOR ELECTRODYNAMO MACHINES

Application filed June 3, 1927. Serial No. 196,160.

This invention relates in general to electrodynamo machines and has particular reference to an improved pole mounting for high speed synchronous machines.

The heretofore accepted practice in the construction of high speed synchronous machines, that is to say, machines intended to develop a peripheral speed of 6,000 to 12,000 feet per minute, has been to cut dove-tails into the spider rim of the rotor which, in turn, engages the dove-tail forming the lower part of the pole punchings. Such a construction is very expensive and necessitates an extra heavy spider rim. It has also been proposed, instead of using cast steel spider rims, to employ spider rims made out of boiler plate, which is assembled on the spider hub and spokes of the rotor. This construction is even more expensive.

The primary object of my invention is to provide a bolted mounting, so to speak, for the poles of these high speed machines which will be much more economical to manufacture than anything heretofore suggested yet just as strong and practical as the more expensive dove-tail mounting above mentioned.

In the accompanying drawing I have selected two practical embodiments of the mounting for the purpose of illustrating the salient features of the invention.

In said drawing:—

Fig. 1 is a view in vertical transverse section of the spider rim showing a pole body mounted thereon in accordance with one form of my invention;

Fig. 2 is a section on line 2—2 of Fig. 1;

Fig. 3 is a section on line 3—3 of Fig. 1;

Fig. 4 is a detail view in perspective of a modified form of mounting plate and stud.

Referring now to the drawing in detail, 5 represents the spider rim of the rotor with a portion of one of the spokes therefor indicated as at 6 (Fig. 1). The purpose of the invention is to mount the laminated pole bodies on the spider 5 by studs in a manner to successfully resist the shearing effect of the excessive centrifugal force developed by the high peripheral speed of the machine. To this end, I propose to employ a series of laminated pole punchings 7 and 8 each of which has a multiplicity of holes or openings adapted to register with like holes in adjacent punchings for the reception of long steel rivets 10 which are thus used to clamp the punchings together to provide a laminated pole body.

Now to mount the laminated pole punchings 7 and 8, I prefer to use a series of solid steel plates 9 which are inserted between the punchings 7 and between the punchings 8 and the spider rim 5. The laminated punchings 8 in this respect become fillers in that they complete the space between the laminated punchings 7 and the solid plates 9. These plates 9 like the laminated pole punchings 7 and 8 are provided with rivet openings for the reception of the steel rivets 10 which pass entirely through the pole body and not only clamp the respective laminations of the pole punchings 7 and 8 but they also clamp the pole punchings and the plates 9 together to assemble the pole body.

Formed as an integral part of each of the steel plates 9 is a stud 11 which projects from the bottom of the plates and through holes made to receive them in the spider rim 5. Nuts 12 being employed to securely anchor them to the rim.

From the above, it will be seen that since the plates 9 are securely clamped in the pole body assembly by the rivets 10, the pole body may thus be mounted to the rim 5 by the studs.

As a modified embodiment, I may form the plates 9 separately of the studs by tapping and threading the plates to receive the threaded ends of the studs 11'. (See Fig. 4.) In this event, I would expect to arrange at least one of the rivet holes to pass through the threaded ends of the studs so as to anchor the same in the plates.

In assembling the pole body the pole punchings 7 and 8 and the steel plates 9 are stacked in a special jig to complete the length of the pole body. When this has been done, the rivet holes are drilled through the steel plates using the holes already punched in the punchings as a drill jig. Thereafter the steel rivets 10 are driven in the rivet and riveted while pressure is applied to the ends of the built up pole body.

The use of the steel rivets 10 and the ease of assembly by using the same provides an unusually convenient and economical method of manufacture and a very strong and practical construction especially when considered in combination with the mounting.

I wish to call special attention to the fact that the long steel rivets are arranged in practically two sets, one set joining the mounting 9 with the high pole punchings 7 and the other set directly joining the short pole punchings 8 with the high punchings 7. In this way, it is not necessary to rely upon the damper winding proper to hold the pole punchings together.

Obviously those skilled in the art may make various changes in the construction and arrangement of parts without departing from the spirit and scope of the invention, and I wish therefore not to be restricted to the precise construction disclosed except as defined in the appended claims.

I claim:—

1. In a pole body for electro-dynamo machines, a series of laminated pole punchings each having a height of substantially that of the pole body, another series of pole punchings assembled between said first-named pole punchings each having a height less than that of the pole body, mounting plates assembled in the pole body beneath said second series of pole punchings, means for joining said pole punchings and plates, and means for mounting said plates to the machine rotor.

2. In a pole body for electro-dynamo machines, a series of laminated pole punchings each having a height of substantially that of the pole body, another series of pole punchings assembled between said first-named pole punchings each having a height less than that of the pole body, mounting plates assembled in the pole body beneath said second series of pole punchings, means for joining said pole punchings and plates, and means for mounting said plates to the machine rotor comprising studs on said plates and openings in the spider rim of said rotor for the reception of said studs.

3. In a pole body for electro-dynamo machines, a series of laminated pole punchings each having a height of substantially that of the pole body, another series of pole punchings assembled between said first-named pole punchings each having a height less than that of the pole body, mounting plates assembled in the pole body beneath said second series of pole punchings, means for joining said pole punchings and plates, and means for mounting said plates to the machine rotor comprising integral studs on said plates and openings in the spider rim of said rotor for the reception of said studs.

4. In a pole body for electro-dynamo machines, a series of laminated pole punchings each having a height of substantially that of the pole body, another series of pole punchings assembled between said first-named series of pole punchings each having a height less than that of the pole body, mounting plates assembled in the pole body beneath said second series of pole punchings, a series of transverse rivets joining said pole punchings one with another, a second series of transverse rivets joining said first-named series of pole punchings with said plates, and means for mounting said plates to the machine rotor.

5. In a pole body for electro-dynamo machines, a series of laminated pole punchings having a height of substantially that of the pole body, another series of pole punchings assembled between said first-named series of pole punchings each having a height less than that of the pole body, mounting plates assembled in the pole body beneath said second series of pole punchings, a series of transverse rivets joining said pole punchings one with another, a second series of transverse rivets joining said first-named series of pole punchings with said plates, and means for mounting said plates to the machine rotor comprising studs on said plates and openings in the spider rim of the said rotor for the reception of said studs.

6. In a pole body for electro-dynamo machines, a series of laminated pole punchings each having a height of substantially that of the pole body, another series of pole punchings assembled between said first-named series of pole punchings each having a height less than that of the pole body, mounting plates assembled in the pole body beneath said second series of pole punchings, a series of transverse rivets joining said pole punchings one with another, a second series of transverse rivets joining said first-named series of pole punchings with said plates, and means for mounting said plates to the machine rotor, comprising integral studs on said plates and openings in the spider rim of the rotor for the reception of said studs.

7. In a pole body for electro-dynamo machines, a series of laminated pole punchings alternating with a series of mounting plates, means joining the plates and pole punchings, and means on the mounting plates for mounting the pole body to the machine rotor, the height of said plates being less than that of the pole punchings, and a second series of laminated pole punchings between the first-named pole punchings and above said plates having their outer edges substantially flush with the edges of the first-mentioned series.

8. In a pole body for electro-dynamo machines, a series of laminated pole punchings alternating with a series of mounting plates, means joining the plates and pole punchings, and means on the mounting plates for mounting the pole body to the machine rotor, the height of said plates being less than that of the pole punchings, and a second series of laminated pole punchings between the first-named pole punchings and above said plates, and means connecting said second series of pole punchings directly with said first-named series.

9. In a pole body for electro-dynamo machines, a series of laminated pole-pieces each having a height of substantially that of the pole body, a second series of pole-pieces assembled between said first-mentioned pole-pieces each having a height less than that of the pole body, mounting plates assembled in the pole body beneath said second series of pole-pieces, means for joining said pole-pieces and plates, and means for mounting said plates to the rotor of an electro-dynamo machine.

10. In a pole body for electro-dynamo machines, a series of pole-pieces alternating with a series of mounting plates, means for joining the plates and pole-pieces together, means on the mounting plates for mounting the pole body to the machine rotor, the height of said plates being less than that of the pole-pieces, a second series of pole-pieces between the first named pole-pieces and above said plates, and means for connecting said second series of pole-pieces directly to said first named series.

In testimony whereof I have signed my name to this specification on this 28th day of May, A. D. 1927.

THEODOR SCHOU.